United States Patent [19]

Cobb

[11] Patent Number: 5,134,523
[45] Date of Patent: Jul. 28, 1992

[54] ZOOM BEAM EXPANDER

[75] Inventor: Joshua M. Cobb, Poughkeepsie, N.Y.

[73] Assignee: International Business Machines Corporation, Armonk, N.Y.

[21] Appl. No.: 806,805

[22] Filed: Dec. 6, 1991

Related U.S. Application Data

[63] Continuation of Ser. No. 515,135, Apr. 26, 1990, abandoned.

[51] Int. Cl.[5] ............... G02B 15/00; G02B 9/62
[52] U.S. Cl. ................... 359/676; 359/754; 359/756
[58] Field of Search ............... 350/423, 464, 463, 474, 350/475

[56] References Cited

U.S. PATENT DOCUMENTS

| | | | |
|---|---|---|---|
| 3,609,006 | 7/1971 | Pospisil | 350/184 |
| 3,994,571 | 11/1976 | Hirose | 350/184 |
| 4,353,617 | 12/1982 | Tokumitsu et al. | 350/6.8 |
| 4,372,654 | 2/1983 | Fujioka et al. | 350/427 |
| 4,460,251 | 7/1984 | Okudaira | 350/427 |
| 4,461,546 | 7/1984 | Muffoletto et al. | 350/453 |
| 4,466,708 | 8/1984 | Bentensky | 350/427 |
| 4,623,226 | 11/1986 | Fujii | 350/427 |
| 4,765,727 | 8/1988 | Mercado | 350/464 |
| 4,818,081 | 4/1989 | Ito | 350/423 |
| 4,836,662 | 6/1989 | Ogata et al. | 350/427 |
| 4,867,545 | 9/1989 | Wakimoto | 359/663 |
| 4,898,457 | 2/1990 | Alexeev et al. | 350/464 |

FOREIGN PATENT DOCUMENTS 4873585  9/1986  Australia.

Primary Examiner—Bruce Y. Arnold
Assistant Examiner—James Phan
Attorney, Agent, or Firm—Floyd A. Gonzalez

[57] ABSTRACT

An achromatic zoom beam expander of the Galilean type. The disclosed zoom beam expander has three components, each having a doublet that is individually color corrected such that the zoom beam expander may be used with a laser such as an argon ion laser which generates light energy at several different wavelengths.

12 Claims, 8 Drawing Sheets

FIG. 3A

| T4 | T8 | MAG. |
|---|---|---|
| 5.0 | 72.475 | 4.251X |
| 6.0 | 72.22 | 4.26X |
| 8.0 | 71.71 | 4.28X |
| 10.0 | 71.19 | 4.30X |
| 20.0 | 68.52 | 4.40X |
| 30.0 | 65.73 | 4.51X |
| 40.0 | 62.79 | 4.62X |
| 50.0 | 59.71 | 4.74X |
| 70.0 | 53.05 | 5.00X |

FIG. 3B

| T4 | T8 | MAG. |
|---|---|---|
| 90.0 | 45.65 | 5.28X |
| 110.0 | 37.35 | 5.60X |
| 130.0 | 28.00 | 5.95X |
| 150.0 | 17.37 | 6.35X |
| 155.0 | 14.48 | 6.46X |
| 160.0 | 11.50 | 6.58X |
| 165.0 | 8.40 | 6.69X |
| 167.0 | 7.13 | 6.74X |
| 169.0 | 5.84 | 6.79X |

FIG. 4        ZOOM BEAM EXPANDER, 4.25X-6.8X

| SURFACE# | RADIUS | THICK | CLEAR APERT. | GLASS | INDEX $\lambda 0.514\mu$ | INDEX $\lambda 0.5435\mu$ | INDEX $\lambda 0.488\mu$ | Vd |
|---|---|---|---|---|---|---|---|---|
| a | -15.23 | 3.0 | 10.0 | SK5 | 1.593542 | 1.591583 | 1.595645 | 61.27 |
| b | 26.85 | 0.025 | 12.0 | AIR | | | | |
| c | 26.85 | 3.0 | 12.0 | SF6 | 1.819816 | 1.813182 | 1.827175 | 25.43 |
| d | 134.8 | VARIABLE | 12.0 | AIR | | | | |
| e | 678.83 | 4.0 | 16.0 | SF6 | 1.819816 | 1.813182 | 1.827175 | 25.43 |
| f | 192.50 | 0.025 | 16.0 | AIR | | | | |
| g | 192.50 | 8.0 | 16.0 | SK5 | 1.593542 | 1.591583 | 1.595645 | 61.27 |
| h | -132.16 | VARIABLE | 16.0 | AIR | | | | |
| i | 709.6 | 4.0 | 20.0 | SF6 | 1.819816 | 1.813182 | 1.827175 | 25.43 |
| j | 203.2 | 0.025 | 20.0 | AIR | | | | |
| k | 203.2 | 8.0 | 20.0 | SK5 | 1.593542 | 1.591583 | 1.595645 | 61.27 |
| l | -137.48 | | 20.0 | | | | | |

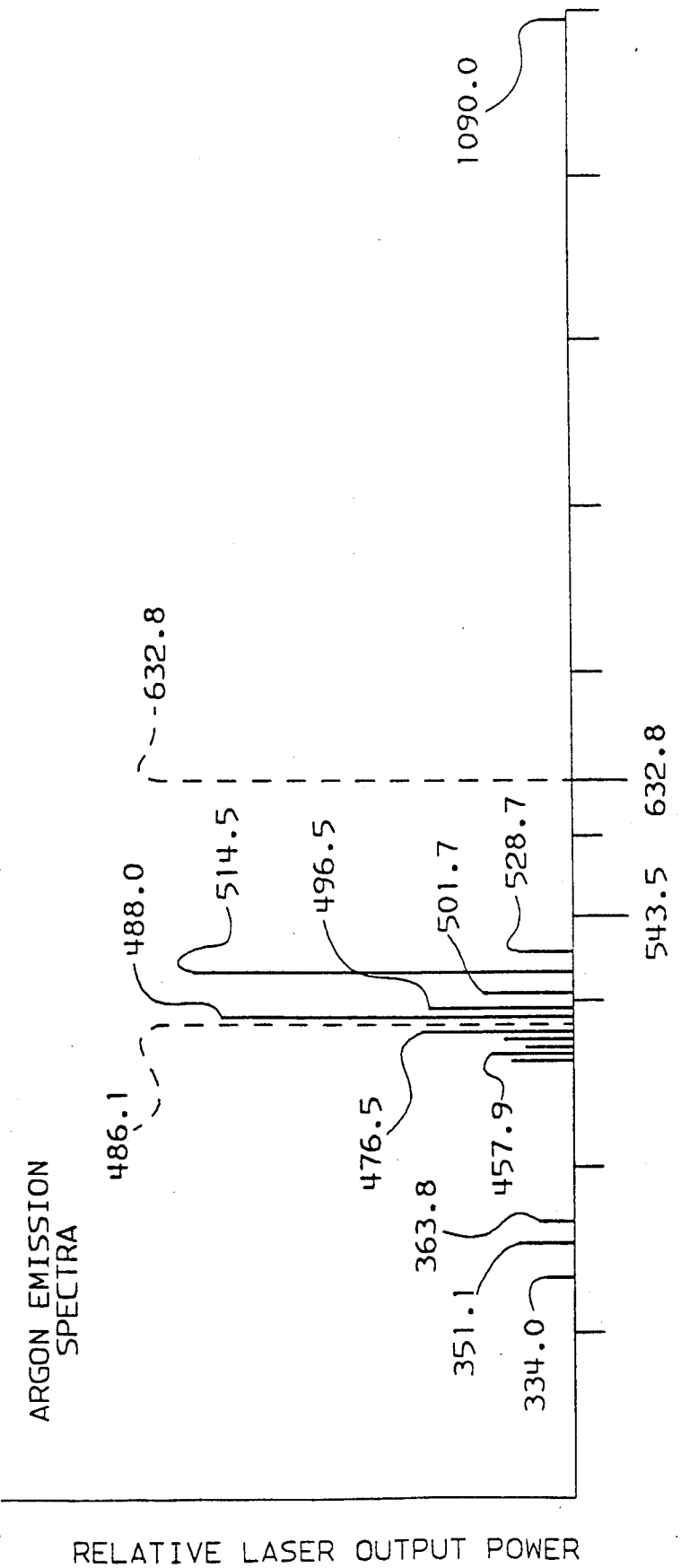
FIG. 5 ARGON EMISSION SPECTRA

ZOOM BEAM EXPANDER

This is a continuation of copending application(s) Ser. No. 07/515,135 filed on Apr. 26, 1990, now abandoned.

BACKGROUND OF THE INVENTION

The present invention relates to a zoom beam expander, and more particularly relates to an achromatic zoom beam expander which is particularly useful in laser chemical deposition tools.

U.S. Pat. No. 4,353,617 to Tokumitsu et al. for "Optical System Capable of Continuously Varying the Diameter of a Beam Spot" issued Oct. 12, 1982 and discloses an afocal zoom lens which continuously varies the diameter of a beam spot. The afocal zoom lens disclosed appears to be useful for only the red to infrared portion of the spectrum.

U.S. Pat. No. 4,461,546 to Muffoletto et al. for "Diffraction-Limited Achromatic Beam Expanding Telescope" issued July 24, 1984 and discloses a laser beam expander having four air-spaced all-spherical-surface lenses arranged in two pairs of Galilean telescope type series. The disclosed telescope is not a zoom lens, does not appear to be color corrected and requires adjustment for each change of wavelength.

U.S. Pat. No 3,609,006 to Pospisil issued July 8, 1971, U.S. Pat. No. 3,994,571 to Hirose issued Nov. 30, 1976, U.S. Pat. No. 4,372,654 to Fujioka et al. issued Feb. 8, 1983, U.S. Pat. No. 4,460,251 to Okudaira issued July 17, 1984, U.S. Pat. No. 4,466,708 to Betensky issued Aug. 21, 1984, U.S. Pat. No. 4,523,226 to Fujii issued Nov. 18, 1986, and U.S. Pat. No. 4,836,662 to Ogata et al. issued June 6, 1989 are all directed to zoom lenses. None of these patents discloses a Galilean zoom beam expander.

U.S. Pat. No. 4,621,890 to Suzuki et al. for "Optical Apparatus Including Two Afocal Systems" issued Nov. 1, 1986 and discloses an optical apparatus for imaging light from a laser device into a spot shape. The disclosed apparatus does not include a zoom beam expander and is directed to providing an apparatus in which the amount of light at the spot will not be changed upon variations of the emitting angle in the laser.

SUMMARY OF THE INVENTION

The present invention relates to an achromatic zoom beam expander which expands the beam size from a laser. The zoom beam expander includes three individually color corrected doublet components wherein one doublet component is fixed and the other doublet components are movable with respect to the fixed doublet component and with respect to each other. The disclosed zoom beam expander is an expander of the Galilean type which expands a collimated laser beam to an expanded collimated laser beam having a larger diameter.

It is a primary object of the present invention to provide an achromatic zoom beam expander useful for expanding a collimated beam from a laser.

It is another object of the present invention to provide a zoom beam expander having three doublet components, one doublet component being fixed and the other doublet components being movable with respect to the fixed doublet component and to each other.

It is another object of the present invention to provide a zoom beam expander wherein the doublet components are individually color corrected.

It is another object of the present invention to provide a zoom beam expander wherein the doublet components are air spaced doublets.

The foregoing and other objects, features and advantages of the invention will be apparent from the following more particular description of the preferred embodiment of the invention as illustrated in the drawings.

BRIEF DESCRIPTION OF THE DRAWINGS

FIGS. 3A and 3B form a chart showing the distance setting of the zoom beam expander for various magnifications varying from the minimum setting of FIG. 1 to the maximum setting of FIG. 2;

FIG. 4 is a chart showing the design specifications of the lens elements of the zoom beam expander of FIGS. 1 and 2;

FIG. 5 is a spectrum diagram of the spectra emitted from an argon ion laser showing the color correction limits of the zoom beam expander of FIGS. 1 and 2 having lens elements designed in accordance with the chart of FIG. 4;

DESCRIPTION OF THE PREFERRED EMBODIMENT

The zoom beam expander of the present invention may be used with a laser deposition tool of the type in which a collimated laser beam is focused by an objective lens onto a substrate in a vacuum chamber containing a gaseous organic metallic compound. The energy of the laser is sufficient to cause a layer of metal to be deposited onto the substrate for forming a conductor on the substrate, as desired. The width of the resulting conductor is determined by the diameter of the collimated laser beam being focused by the objective lens onto the substrate. Lasers are known which produce a collimated light beam having the required energy to perform the described laser deposition. One such laser is the argon ion laser. The present zoom beam expander is a zoom lens of the Galilean type which expands the collimated beam from the laser to give a collimated beam having various enlarged diameters, as desired. The use of the present zoom beam expander thus allows metal conductors of various widths, as desired, to be deposited on a substrate using the laser deposition technique.

Figure 1:
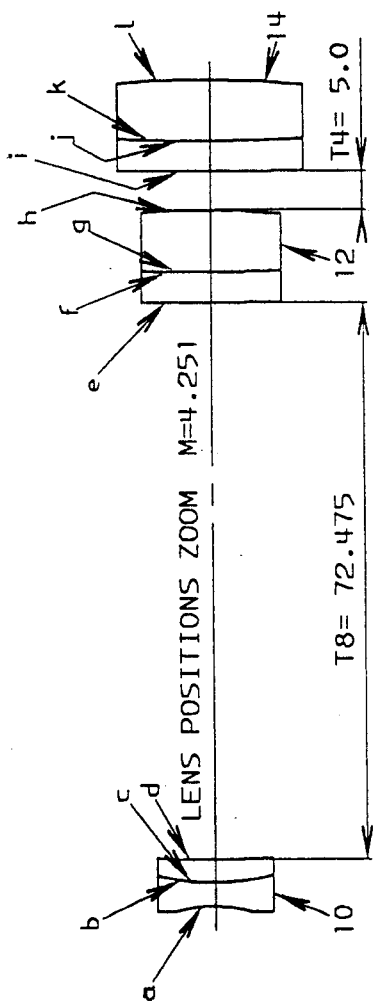
FIG. 1 is a cross-sectional view of a zoom beam expander of the present invention arranged to have a magnification of 4.251X.
Figure 2:
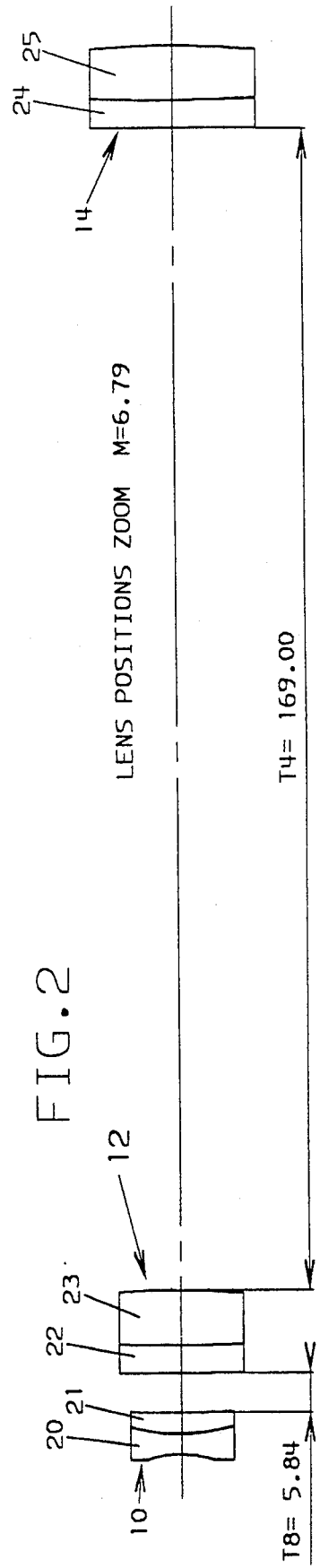
FIG. 2 is a cross-sectional view of the zoom beam expander of the present invention arranged to have a magnification of 6.79X.

FIGS. 1 and 2 are cross-sectional views of a zoom beam expander of the present invention. In FIGS. 1 and 2, a collimated beam of light travels from left to right through the expander. The expander includes three air spaced lens doublets 10, 12 and 14. Doublet 10 will be referred to herein as the first doublet and the doublets 12 and 14, being movable with respect to doublet 10 and with respect to each other, will be referred to herein as the second and third doublets, respectively. As shown in FIG. 2, the doublet 10 has lens elements 20 and 21, the doublet 12 has lens elements 22 and 23, and the doublet 14 has lens elements 24 and 25. The distance between the doublets 12 and 14 is referred to herein as T4, and the distance between the doublets 10 and 12 is referred to herein as T8. The spacings for T4 and T8 as shown in FIG. 1 is for the smallest magnification of the expander (4.251X), and the spacings shown in FIG. 2 is for the maximum magnification (6.79X). It will be understood that in the zoom lens of the present invention, one doublet, typically the first doublet (doublet 10) or the third doublet (doublet 14), will be fixed, with the other two doublets being movable with respect to each other and with respect to the fixed doublet. In the preferred embodiment, the third doublet (doublet 14) is fixed.

FIGS. 3A and 3B form a chart which shows the T4 and T8 distances for various magnifications varying from 4.251X to a maximum of 6.79X. The positions of the lens doublets 10, 12 and 14 shown in FIG. 1 are shown in the first line of the chart of FIG. 3A, and the positions shown in FIG. 2 are shown in the last line of FIG. 3B.

FIG. 4 is a chart showing the design of the lens element 20-25 of FIGS. 1 and 2. The surface column of the chart of FIG. 4 identifies the surface of the lens element, the radius column gives the radius in millimeters of the surface, the thick column gives the center thickness in millimeters from the surface to the following surface, and the clear apert. Column gives the diameter of the clear aperture in the center of the surface. The glass column identifies glass available from Schott Glass Technologies, Inc. of Duryea, Pa. The next three columns give the index of refraction of the glass for three wavelengths of light passing through the glass. The three wavelengths are 0.514 microns, 0.5435 microns and 0.488 microns. The last column of the chart of FIG. 4 is the Abbe Nu number of d light ($V_d$) for the glass. The index of refraction for d light ($n_d$) is 1.58913 for glass having a $V_d$ of 61.27, and 1.80518 for glass having a $V_d$ of 25.43. The radii for surfaces a and h have negative numbers, indicating that the center point for the arc of that surface is to the left of the surface. Referring to FIG. 1 and 2, lens element 20 has surfaces a and b, lens element 21 has surfaces c and d, lens element 22 has surfaces e and f, lens element 23 has surfaces g and h, lens element 24 has surfaces i and j, and lens element 25 has surfaces k and l. There are 0.025 millimeter air spaces between the surfaces b and c, f and g, and j and k to form the doublet components 10, 12 and 14, respectively. Surfaces a, b, d, f and j are concave surfaces, and surfaces c, e, g, h, i, k and l are convex surfaces. It will be understood that one skilled in the art may design the lens elements 20-25 from the information shown in FIG. 4.

The zoom beam expander made in accordance with FIG. 4 is an achromatic zoom beam expander wherein each doublet is individually color corrected, with the first and second doublet components 10 and 12 forming a divergent lens group and the third doublet component 14 forming a collimator. Since each of the doublets 10, 12 and 14 are individually color corrected, a variety of light having different wavelengths may be simultaneously focused by an objective lens after having been expanded. FIG. 5 is a spectrum diagram of the spectra emitted from an argon ion laser. The zoom beam expander of FIGS. 1 and 2 is color corrected between the limits of about 486.1 nanometers and about 632.8 nanometers. These limits are shown as dotted lines on FIG. 5, and illustrate that an argon ion laser may be expanded by the present zoom beam expander without a significant loss of energy in the dominant energies of the spectra. Also, as can be seen in FIG. 5, the range of the zoom beam expander includes 543.5 nanometers which is the emission of green light from a green helium neon laser, and 632.8 which is the wavelength of red light emitted from a red helium neon laser. This has the advantage that calibration and alignment of a device using the present zoom beam expander may be made using relatively inexpensive helium neon lasers before the installation of an expensive high energy output argon ion lasers in the device.

Figure 6:
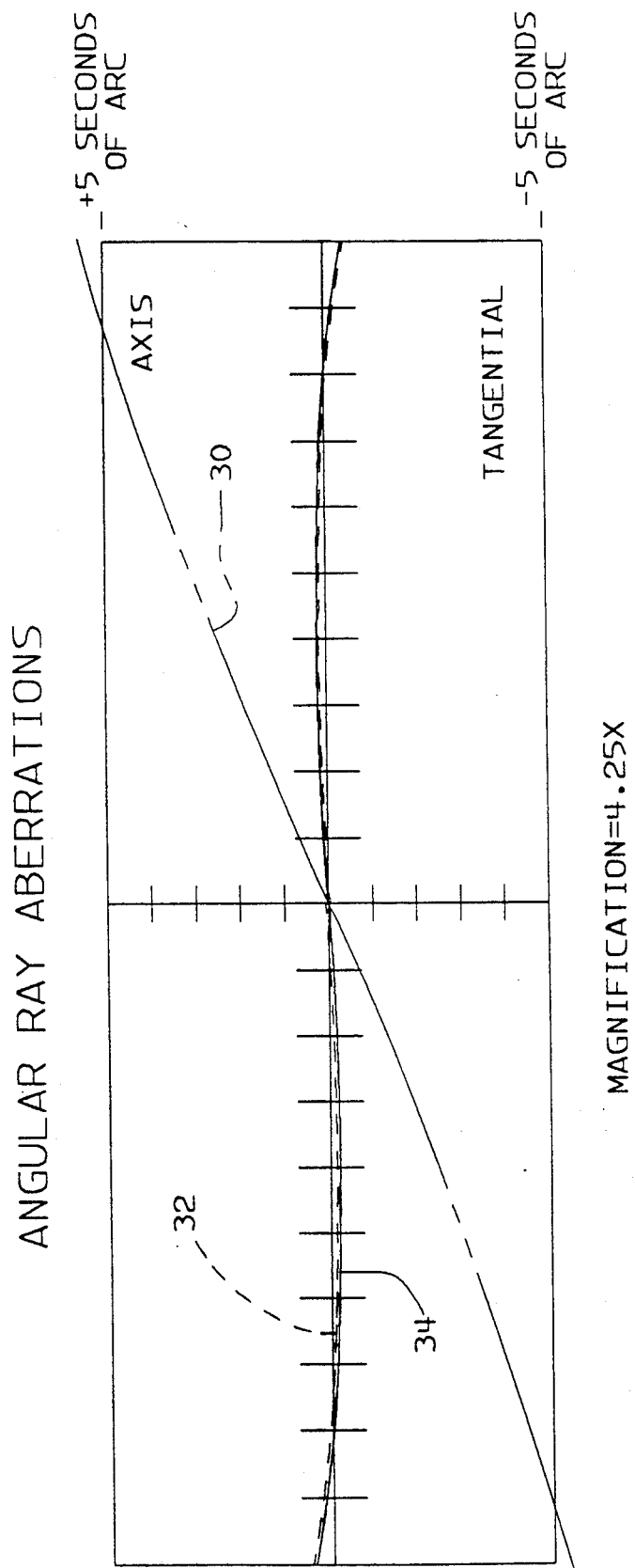
FIG. 6 is a graph showing the angular ray aberrations of the zoom beam expander of FIG. 1.

FIG. 6 is a graph showing the angular ray aberrations of the configuration of FIG. 1 wherein the zoom beam expander has a magnification of 4.25X. The aberations for red light having a wavelength of 632.8 nanometers is shown by line 30 of FIG. 6, the aberrations for green light having a wavelength of 514.5 nanometers is shown by line 32, and the aberrations for blue light having a wavelength of 488.0 nanometers is shown by line 34. It can be seen that the maximum aberration for the chart of FIG. 6 is about 5 seconds of arc for red light, and is very nearly zero for the blue and green light.

Figure 7:
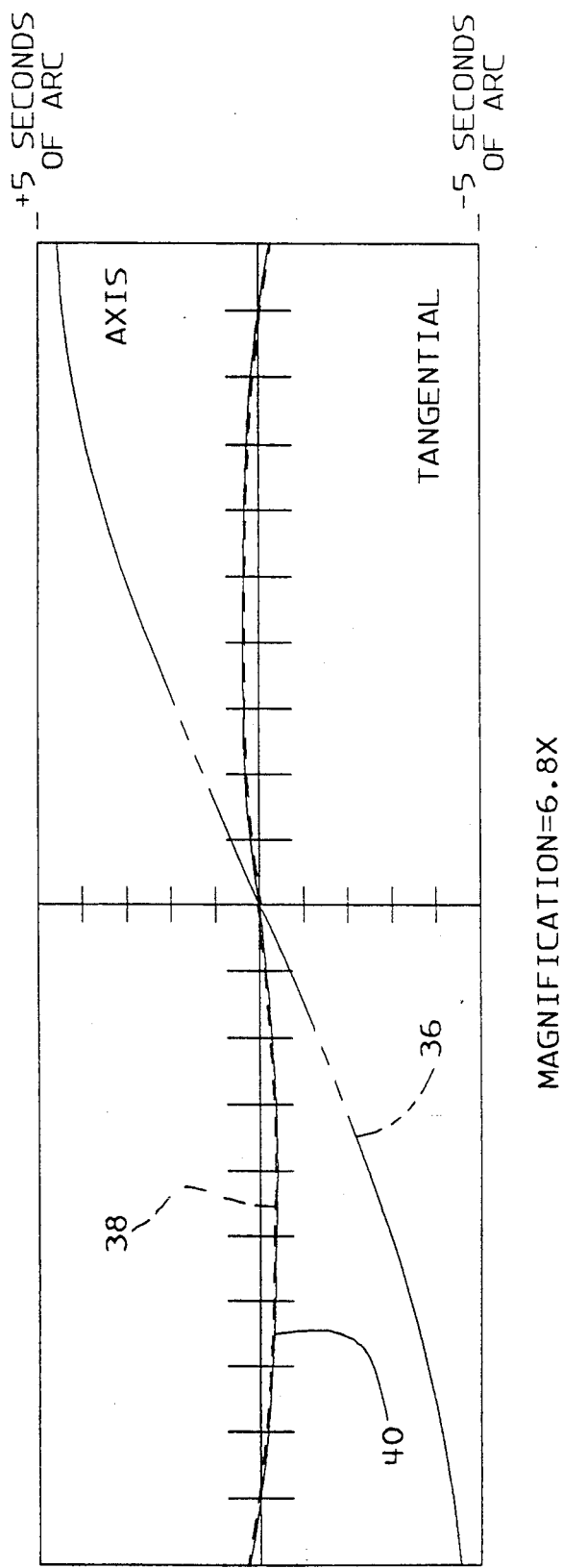
FIG. 7 is a graph showing the angular ray aberrations of the zoom beam expander of FIG. 2.

FIG. 7 is a similar graph showing the angular ray aberations for the configuration of FIG. 2 wherein the zoom beam expander has a magnification of 6.8X. The aberration of red light is shown by line 36, the aberration for green light is shown by line 38, and the aberration for blue light is shown by line 40.

Figure 8:
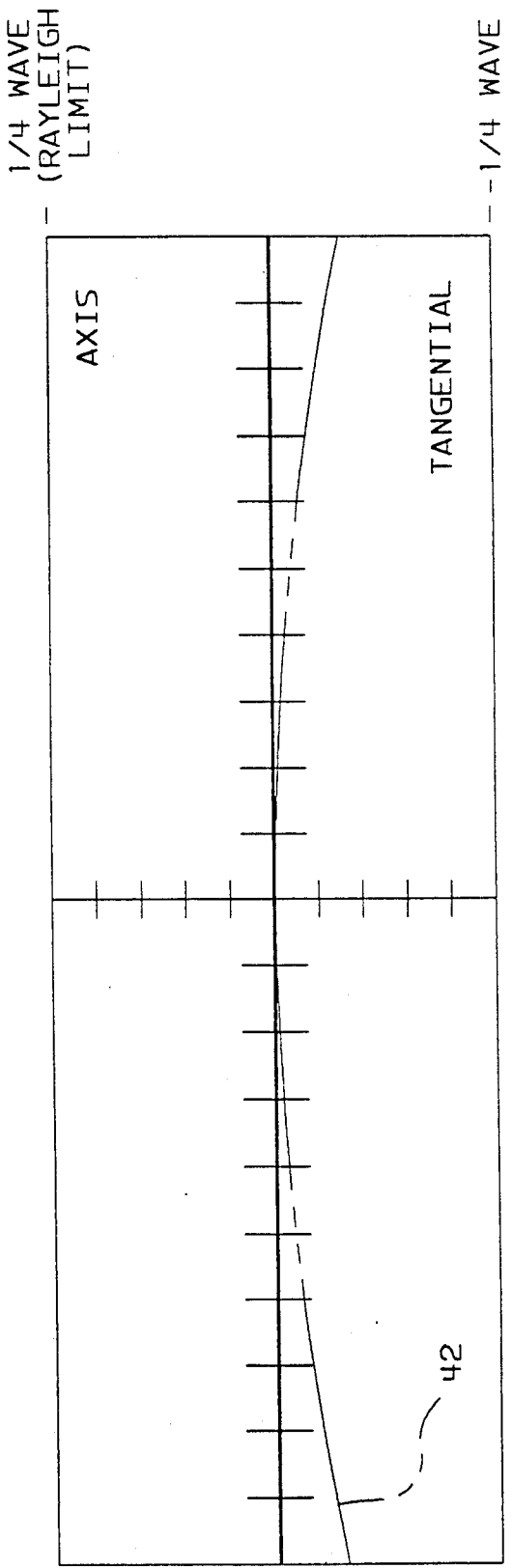
FIG. 8 is a graph showing the optical path differences of the zoom beam expander of FIG. 1.

FIG. 8 is a chart showing the optical path differences of the configuration of FIG. 1 wherein the zoom beam expander has a magnification of 4.25X. The optical path difference for red light is shown by line 42, and the optical path difference for blue and green light is so small that it cannot be seen on the chart of FIG. 8.

Figure 9:
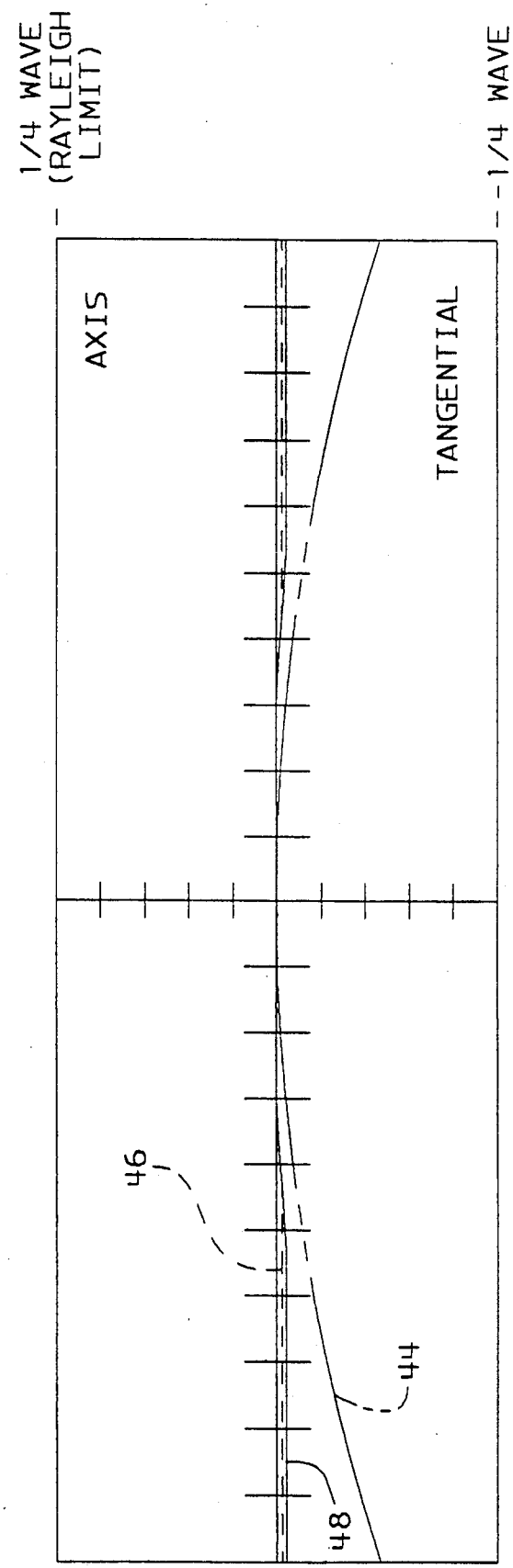
FIG. 9 is a graph showing the optical path differences of the zoom beam expander of FIG. 2.

FIG. 9 is a chart showing the optical path differences of the configuration of FIG. 2 wherein the zoom beam expander has a magnification of 6.8X. The optical path difference for red light is shown by line 44, the optical path difference for green light is shown by line 48, and the optical path difference of blue light is shown by line 46.

While I have illustrated and described the preferred embodiment of my invention, it is to be understood that I do not limit myself to the precise construction herein disclosed, and the right is reserved to all changes and modifications coming within the scope of the invention as defined in the appended claims.

Having thus described my invention, what I claim as new, and desire to secure by Letters Patents is:

1. An achromatic zoom beam expander comprising a first air spaced doublet component, a second air spaced doublet component, and a third air spaced doublet component, said second doublet component being intermediate said first and third doublet components, each of said first, second and third doublet components being individually color corrected, and said first and second doublet components being movable with respect to said third doublet component and with respect to each other for providing a continuous variation in beam magnification, said first and second doublet components together forming a divergent lens group, and said third doublet component forming a collimator which does not form an image.

2. The achromatic zoom beam expander of claim 1, wherein each of said first, second and third doublet components is corrected for light including wavelengths in the range of about 486.1 nanometers to about 632.8 nanometers.

3. The achromatic zoom beam expander of claim 2 wherein said first, second and third doublet components are corrected for aberration such that the total divergence caused by aberration for the zoom beam expander is within about plus or minus 5 seconds of arc.

4. The achromatic zoom beam expander of claim 1 wherein the distance between said second and third doublet component is adjustable from about 5 millimeters to about 169 millimeters.

5. The achromatic zoom beam expander of claim 4 wherein said third doublet component is fixed, and the distance between said first and second doublet components is dependent on the spacing between said second and third doublet components, and said spacing between said first and second doublet components is adjustable from a minimum magnification setting of 72.475 millimeters when the distance between said second and third doublet components is 5 millimeters to a maximum magnification setting of 5.84 millimeters when the distance between said second and third doublet components is 169 millimeters.

6. The achromatic zoom beam expander of claim 5 wherein the magnification of the beam varies from about 4.25X at said minimum magnification setting to about 6.8X at said maximum magnification setting.

7. The achromatic zoom beam expander of claim 1 wherein said first doublet component comprises:
- a first element including a first surface having a concave radius of curvature of 15.23 millimeters, a second surface having a concave radius of curvature of 26.85 millimeters and a center thickness of 3.0 millimeters;
- a second element including a first surface having a convex radius of curvature of 26.85 millimeters, a second surface having a concave radius of curvature of 134.8 millimeters, and a center thickness of 3.0 millimeters; and
- an air space intermediate said first and second elements having a center thickness of 0.025 millimeters.

8. The achromatic zoom beam expander of claim 7 wherein said first element of said first doublet is made of glass having an index of refraction for d light ($n_d$) of 1.58913 and an Abbe Nu number of d light ($V_d$) of 61.27, and said second element of said first doublet is made of glass having a $n_d$ of 1.80518 and a $V_d$ of 25.43.

9. The achromatic zoom beam expander of claim 8 wherein said second double component comprises:
- a first element including a first surface having a convex radius of curvature of 678.83 millimeters, a second surface having a concave radius or curvature of 192.5 millimeters and a center thickness of 4.0 millimeters;
- a second element including a first surface having a convex radius of curvature of 192.5 millimeters, a second surface having a convex radius of curvature of 132.16 millimeters, and a center thickness of 8.0 millimeters; and
- an air space intermediate said first and second elements having a center thickness of 0.025 millimeters.

10. The achromatic zoom beam expander of claim 9 wherein said first element of said second doublet is made of glass having a $n_d$ light of 1.80518 and a $V_d$ of 25.43, and said second element of said second doublet is made of glass having a $n_d$ of 1.58913 and a $V_d$ of 61.27.

11. The achromatic zoom beam expander of claim 10 wherein said third doublet component comprises:
- a first element including a first surface having a convex radius of curvature of 709.6 millimeters, a second surface having a concave radius of curvature of 203.2 millimeters, and a center thickness of 4.0 millimeters;
- a second element including a first surface having a convex radius of curvature of 203.2 millimeters, a second surface having a convex radius of curvature of 137.48 millimeters, and a center thickness of 8.0 millimeters; and
- an air space intermediate said first and second elements having a center thickness of 0.025 millimeters.

12. The achromatic zoom beam expander of claim 11 wherein said first element of said third doublet is made of glass having a $n_d$ of 1.80518 and a $V_d$ of 25.43, and said second element of said third doublet is made of glass having a $n_d$ of 1.58913 and a $V_d$ of 61.27.

* * * * *